United States Patent Office 3,125,555
Patented Mar. 17, 1964

3,125,555
VINOXYCARBONYLMETHYLTRIALKYLPHOSPHONIUM HALIDES AND POLYMERS THEREOF
Philip John Paré, Yorktown Heights, N.Y., and Martin Hauser, Stamford, Conn., assignors to American Cyanamid Company, New York, N.Y., a corporation of Maine
No Drawing. Filed Oct. 26, 1961, Ser. No. 147,733
10 Claims. (Cl. 260—89.1)

This invention relates to a process for producing monomers containing both vinyl ester and trialkyl phosphonium groups and the monomers per se. This invention further relates to the production of a novel group of monomers containing both vinyl ester and trialkyl phosphonium groups and to polymers produced therefrom. This invention still further relates to novel methods of producing polymers containing trialkyl phosphonium groups and the polymers per se.

We have found a new group of monomers containing vinyl ester and trialkyl phosphonium groups which may be utilized as intermediates in the formation of various polymers. The new and novel monomers are produced by reacting various vinyl esters of simple halo-substituted acids with various trialkyl phosphines. We have found that this process expediently produces novel compounds in high yield and that these compounds can then be polymerized to form homopolymers or copolymers having excellent flame resistant properties. We believe these properties of flame resistance are attributed to the quaternary halide ion which is produced upon reacting the phosphines with the halo-acid esters. The reaction which occurs during this process can be more fully appreciated by the following equation:

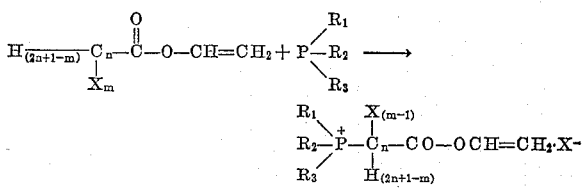

wherein X is a halogen atom, $m$ is a whole positive integer of from 1 to 3, $n$ is a whole positive integer of from 1 to 4 and $R_1$, $R_2$ and $R_3$ are the same or different branched or straight chain alkyl radicals having from 1 to 8 carbon atoms.

It is an object of the present invention to produce novel compounds by an expedient, high-yield process. It is a further object of the present invention to produce novel monomers containing both vinyl ester and trialkyl phosphonium groups. It is still further an object of the present invention to produce various novel polymers having excellent flame resistant properties and containing trialkyl phosphonium groups. These and other objects of the present invention will become more apparent upon reading the more detailed description presented hereinbelow.

The method for the production of the novel monomers presented herein comprises reacting a trialkyl phosphine compound with a vinyl ester of a simple halo-acid. The reaction proceeds quite rapidly at a temperature of from about —70° C. to about 175° C., preferably 0° C. to 80° C. The reaction is carried out preferably at atmospheric pressure. However, it is also possible to use subatmospheric or superatmospheric pressures whenever it is deemed expedient.

It is preferred that the reaction be carried out under an inert gas blanket in order to prevent the influx of oxygen and other contaminants into the reaction vessel. Inert gases which may be used for this purpose include nitrogen, carbon dioxide, carbon monoxide, normally gaseous hydrocarbons, i.e. propane, neon, argon, and the like.

The reaction may be carried out in the absence of or in the presence of solvents, but in the present process it is preferred that a solvent be utilized. The amount of solvent necessary is that which will solubilize the phosphine and the vinyl ester of the halo-acid. Generally, such compounds as benzene, toluene, ether, xylene and the like may be used for this purpose.

It is critical at this stage of the process that the ingredients of the reaction vessel be "substantially anhydrous." By "substantially anhydrous" is meant containing less than about 0.1% water. When the reaction vessel contains more than 0.1% water, the yield is substantially lowered, rendering the process impractical. It has been found that in order to produce increased practical yields that 0.1% water is the tolerable maximum.

The reaction is allowed to commence for a period of from about 1 to 8 hours, preferably 2 to 4 hours, and the novel monomer of the present invention is recovered from the reaction media utilizing means dependent upon the physical form of the final product produced. That is to say, when the final product is in the form of crystals, it may be separated by filtration, decantation, centrifugation, etc. and recrystallized from a nonsolvent. When the product is in the form of a liquid, it is recovered by distilling off the solvent used, if any, thereby isolating the desired product.

The monomers range in color from colorless and clear to orange and, as mentioned above, are in the form of either crystals or liquids when isolated.

The compounds which may be used as starting materials for preparing the novel monomers of the present invention, and which are described hereinabove as vinyl esters of simple halo-acids, have the following formula:

(I)
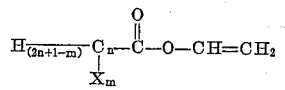

wherein X is a halogen radical, $m$ is a whole positive integer from 1 to 3 and $n$ is a whole positive integer of from 1 to 4. Compounds which are represented by the above Formula I include vinyl chloroacetate, vinyl bromoacetate, vinyl iodoacetate, vinyl fluoroacetate, vinyl β-chloropropionate, vinyl β-bromopropionate, vinyl β-iodopropionate, vinyl α-bromopropionate, vinyl α-iodopropionate, vinyl α-fluoropropionate, vinyl α,α,β-trichloropropionate, vinyl α,α,β-trifluoropropionate, vinyl α,α,β-triiodopropionate, vinyl α,α,β-tribromopropionate, vinyl chlorobutyrate, vinylbromobutyrate, vinyl fluorobutyrate, vinyl iodobutyrate, and the like.

The above vinyl esters are reacted in a quaternization-type reaction with trialkyl phosphines having the following formula:

(II)

wherein $R_1$, $R_2$ and $R_3$ are the same or different branched or straight chain alkyl groups having 1 to 8 carbon atoms. Compounds which are represented by this formula include tributyl phosphine, triisobutyl phosphine, trioctyl phosphine, trimethyl phosphine, triethyl phosphine, tripropyl phosphine, triisopropyl phosphine, triamyl phosphine, triisoamyl phosphine, trihexyl phosphine, triheptyl phosphine, dibutylamyl phosphine, diethylmethyl phosphine, methyldibutyl phosphine, amyldioctyl phosphine and the like.

As an example of the monomers produced by the present process, utilizing vinyl chloroacetate, the most commercially available ester used herein, the reaction with a trialkyl phosphine produces a monomer having the formula (III) 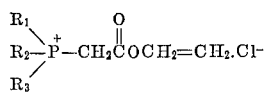

wherein $R_1$, $R_2$ and $R_3$ are the substituents set forth above in respect to Formula II.

As mentioned above, the novel monomers of the present invention may be polymerized to form unique polymers which posses excellent flame resistance. The polymers are produced by polymerizing the novel monomers in the presence of various catalysts of which the following are illustrative. The inorganic peroxides, e.g., hydrogen peroxide, barium peroxide, magnesium peroxide, etc., and the various organic peroxy catalysts, illustrative examples of which are: the dialkyl peroxides, e.g., diethyl peroxide, dipropyl peroxide, dilauryl peroxide, dioleyl peroxide, distearyl peroxide, di-(tertiary-butyl) peroxide, and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide succinyl peroxide, phthaloyl peroxide, benzoyl peroxide, etc.; fatty oil acid peroxides, e.g., coconut oil acid peroxides, etc.: unsymmetrical or mixed diacyl peroxides, e.g., acetyl benzoyl peroxide, propionyl benzoyl peroxide, etc.; terpene oxides, e.g., ascaridole, etc.; and salts of inorganic per-acids, e.g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following: tetralin hydroperoxide, tertiary-butyl diperphthalate, cumene hydroperoxide, tertiary-butyl perbenzoate, 2,4-dichlorobenzoyl peroxide, urea peroxide, caprylyl peroxide, p-chlorobenzoyl peroxide, 2,2-bis-(tertiary-butyl peroxy) butane, hydroxyheptyl peroxide and diperoxide of benzaldehyde. Other so-called "free radical" types of catalysts, e.g., $\alpha,\alpha'$-azo-diisobutyronitrile, nitrilotrispropionamide, also can be used to accelerate polymerization.

Illustrative examples of water-soluble activators (water-soluble polymerization adjuvants) of the catalyst are oxygen-containing sulfur compounds which are capable of undergoing oxidation, for instance, sulfur dioxide, the alkali metal (e.g., sodium, potassium, etc.) bisulfites, hydrosulfites, thiosulfates, sulfurous acid (or compounds which engender sulfurous acid, e.g., alkali metal sulfites, ethyl and other alkyl sulfites, etc.), various organic sulfinic acids, e.g., p-toluene sulfinic acid, formamidine sulfinic acid, etc.

The amount of catalyst used may be varied widely depending upon the particular catalyst utilized and the other polymerization conditions and may range generally from about 0.1% to about 5% or even as high as 10% or more based on the weight of monomer utilized. Preferably, the amount of catalyst is within the range of from about 0.1% to about 3% or 4% by weight of the total monomers added. The polymerization reaction may be carried out under an inert atmosphere, those gases indicated above in respect to the production of the novel monomers of the instant invention being exemplary. The reaction may be carried out with or without a solvent but, as in the case of the vinyl ester reaction, it is preferred that a solvent be utilized. Such compounds as benzene, toluene, and the like may be used for this purpose. Generally, any inert solvent may be utilized, said solvent being a solvent for the monomer only.

The polymerization reaction may be carried out within a temperature range of from about 25° C. to about 125° preferably within the range of from about 60° C. to 100° C.

Residence time of the reactants in the reaction zone may also be controlled for optimum results. We have found that the residence time may vary from as little as 30 minutes to as much as 96 hours. However, it is preferred that the residence time be within the order of from about 2 hours to about 6 hours. Obviously, it is preferred that the residence time in the reaction zone be a minimum in view of various economic considerations. The reaction is preferably carried out at atmospheric pressure although obviously, subatmospheric and superatmospheric pressures may be used as desired. The resultant polymeric materials are water-insoluble and are usually recovered in excellent yields from the reaction media by precipitation with a known nonsolvent therefor.

The polymers may be produced in the form of homopolymers of the novel compounds claimed herein, copolymers of the novel compounds claimed herein, or copolymers of the novel compounds claimed herein with various copolymerizable monomers containing a $CH_2=C<$ group.

When preparing copolymers of the novel monomers of the present invention it is generally acceptable to use a weight ratio of from about 1% to about 50% of the novel phosphonium compounds of the present invention with about 99% to 50% of the unsaturated monomers polymerizable therewith, however it is preferred to use a weight ratio of about 5% to about 30% of the novel phosphonium monomers with about 95% to 70% of the monomers copolymerizable therewith.

Examples of monomers which can be copolymerized with the novel monomers of the present invention, and which can be copolymerized either singly or in a plurality (two, three, four or any desired number), the latter often being desirable in order to improve the compatability and copolymerization characteristics of the mixture of monomers and to obtain new and valuable copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), i e., methyl methacrylate, crotonic, oxalic, malonic, succinic, glutaric, adipic, pimelic, suberic, azelaic, sebacic, maleic, furamic, citramonic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate etc.; ethylene; butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids.

Other examples of monomers than can be polymerized with the monomers of the present invention are the vinyl halides, more particularly vinyl fluoride, vinyl chloride, vinyl bromide and vinyl iodide, and the various vinylidene compounds, including the vinylidene halides, e.g., vinylidene chloride. vinylidene bromide, vinylidene fluoride and vinylidene iodide, other comonomers ebing added if needed in order to improve the compatability and copolymerization characteristics of the mixed monomers.

More specific examples of allyl compounds that can be copolymerized with the monomers of the present invention are allyl alcohol, methallyl alcohol, diallyl carbonate, allyl lactate, allyl alpha-hydroxyisobutyrate, allyl trichlorosilane, diallyl methylgluconate, diallyl tartronate, diallyl tartrate, dially mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example, in United States Patent No. 2,510,503, issued June 6, 1950.

Among the comonomers which are preferred for use in carrying our invention into effect are, for example, compounds such as acrylonitrile, the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Other monomers copolymerizable with the instant novel monomers are given, for instance, in United States Patent No. 2,601,572, dated June 24, 1952, where examples are given both by classes and species.

When copolymerizing the novel compounds of the present invention with each other, any amount of either monomer may be used depending upon the desired properties of the resultant copolymer.

The polymers produced by homopolymerizing the novel monomers of the present invention will be composed of recurring units of the formula

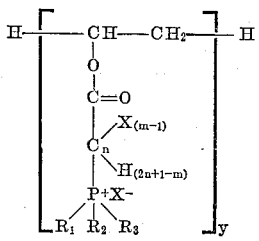

wherein $R_1$, $R_2$ and $R_3$, $m$, $n$, and $X$ are as set forth hereinabove in regard to Formulae I and II.

As mentioned above, the monomers of the present invention comprise novel intermediates for the production of the novel polymers of the present invention. These polymers may be used for such purposes as imparting flame resistance to textiles, building materials and other objects wherein flame resistance is of prime importance.

In order to more fully comprehend the present invention, the following examples are set forth. These examples are not to be construed as limitations on the present invention except as set forth in the appended claims. All parts and percentages are by weight unless otherwise specified.

EXAMPLE 1

To a suitable reaction vessel equipped with stirrer, thermometer, dropping funnel, reflux condenser and gas inlet and containing an ice-cooled solution of 20 parts of tributyl phosphine in 44 parts of benzene, under a nitrogen atmosphere, is added a solution of 12 parts of vinyl chloroacetate in 44 parts of water. The reaction media is allowed to stand for about 2 hours and crystals begin to appear. After 2 hours, the reaction is completed and the crystals are separated by filtration and recrystalized from benzene. A yield of 66% of vinoxycarbonylmethyltributylphosphonium chloride is recovered. Analysis of the product shows the following:

Table I

|  | C | H | Cl |
|---|---|---|---|
| Calculated, percent | 59.5 | 9.9 | 11.0 |
| Found, percent | 59.1 | 10.1 | 11.7 |

EXAMPLE 2

To a suitable reaction vessel, equipped as in Example 1, is added a solution of 12 parts of vinyl chloroacetate and 20 parts of triisobutyl phosphine in 48 parts of benzene. Nitrogen is bubbled into the vessel and the solution is warmed to 37° C. until a precipitate begins to form. The mixture is then cooled in an ice bath for about 2 hours. The crystals formed are then separated by filtration and recrystalized from benzene. A yield of 44% of vinoxycarbonylmethyltriisobutylphosphonium chloride is recovered. Analysis of the product shows the following:

Table II

|  | C | H | Cl |
|---|---|---|---|
| Calculated, percent | 59.5 | 9.9 | 11.0 |
| Found, percent | 59.2 | 10.0 | 11.6 |

EXAMPLE 3

To a suitable reaction vessel, equipped as in Example 1, is charged 6 parts of vinyl chloroacetate and 18.5 parts of trioctyl phosphine in 25 parts of benzene. A nitrogen atmosphere in maintained over the reaction mixture and said mixture is warmed to 63° C. for about 1 hour. The reaction media is then distilled until the benzene has been removed leaving, as a residue, an orange oil. Upon identification by infrared spectroscopy, a 77% yield of vinoxycarbonylmethyltrioctylphosphonium chloride is realized.

EXAMPLE 4

Utilizing the procedure of Example 1 except that vinyl bromoacetate is substituted for vinyl chloro acetate, a 62% yield of vinoxycarbonylmethyltributylenephosphonium bromide is obtained.

EXAMPLE 5

Again utilizing the procedure of Example 1 except that vinyl β-chloropropionate is used instead of vinyl chloroacetate, a colorless oil, identified as 2-vinoxycarbonylethyltributylphosphonium chloride, in a yield of 67%, is recovered by evaporation of the benzene.

EXAMPLE 6

Vinyl α-chloropropionate is utilized instead of vinyl chloroacetate and the procedure of Example 1 is followed. Evaporation of the benzene yields about 43% of 1-vinoxycarbonylethyltributylphosphonium chloride, a colorless oil.

EXAMPLE 7

Again utilizing the procedure of Example 1, vinyl α,α,β-trichloropropionate is substituted for vinyl chloroacetate. Evaporation of the benzene reveals a viscous, colorless oil identified as vinoxycarbonyldichloroethyltributylphosphonium chloride recovered in a 38% yield.

EXAMPLE 8

A solution of 20 parts of vinoxycarbonylmethyltributylphosphonium chloride, 0.1 part of benzoyl peroxide and 100 parts of benzene is heated at 80° C. for 72 hours under a nitrogen atmosphere in a suitable reaction vessel equipped as in EXAMPLE 1. The solution is then diluted with 25 parts of ligroine and a resinous polymer is recovered and purified by dissolving in benzene and precipitating with ligroine. The yield of polymer is 16 parts or 80%.

EXAMPLE 9

To a suitable reaction vessel is added 50 parts of acrylonitrile in 100 parts of benzene. 16 parts of vinoxycarbonylmethyltributylphosphonium chloride, in 100 parts of benzene, is then added along with 0.3% of benzoyl peroxide. The reaction mixture is heated to a temperature of 75° C. for approximately two hours. The solution becomes very viscous and a copolymer of the phosphonium chloride and acrylonitrile is recovered by precipitation thereof from a nonsolvent for the copolymer. The yield of copolymer is 43 parts or 65%.

EXAMPLE 10

To a reaction vessel is charged a solution of 16 parts of vinoxycarbonylmethyltributylphosphonium chloride and 95 parts of methyl methacrylate in 100 parts of toluene. About 0.4% of α,α′-azodiisobutyronitrile is added and the reaction media is heated to a temperature of 180° C. for about 3 hours. A yield of 65% of copolymer is recovered by precipitation of the polymer from the reaction media with a nonsolvent therefor.

We claim:

1. A method for the production of a polymerizable monomer containing both vinyl ester and trialkyl phosphine groups which comprises reacting, in a substantially anhydrous medium, (1) a vinyl ester of a halo-acid having the formula

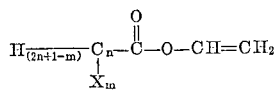

wherein X is an halogen radical, $m$ is a whole positive integer of from 1 to 3, inclusive, and $n$ is a positive whole integer from 1 to 4, inclusive, with (2) a trialkyl phosphine having the formula

wherein $R_1$, $R_2$ and $R_3$ are alkyl groups having from 1 to 8 carbon atoms, inclusive.

2. A method for the production of a polymerizable monomer containing both vinyl ester and trialkyl phosphine groups which comprises reacting, in a substantially anhydrous medium, (1) vinyl chloroacetate with (2) a trialkyl phosphine having the formula

wherein $R_1$, $R_2$ and $R_3$ are alkyl groups having 1 to 8 carbon atoms, inclusive.

3. A method for the production of a polymerizable monomer containing both vinyl ester and trialkyl phosphine groups which comprises reacting, in a substantially anhydrous medium, (1) a vinyl ester of a halo-acid having the formula

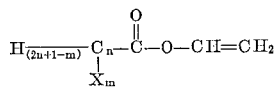

wherein X is a halogen radical, $m$ is a whole positive integer of from 1 to 3, inclusive, and $n$ is a whole positive integer of from 1 to 4, inclusive, with (2) tributyl phosphine.

4. A method for the production of vinoxycarbonylmethyltributylphosphonium chloride which comprises reacting, in a substantially anhydrous medium, vinyl chloroacetate with (2) tributyl phosphine.

5. A polymerizable monomer having the formula

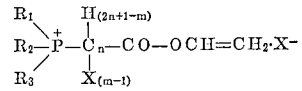

wherein $R_1$, $R_2$ and $R_3$ are alkyl groups having 1 to 8 carbon atoms, inclusive, $m$ is a whole positive integer of from 1 to 3, inclusive, $n$ is a whole positive integer of from 1 to 4, inclusive, and X is a halogen atom.

6. A polymerizable monomer having the formula

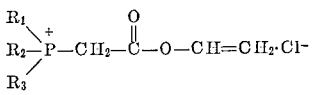

wherein $R_1$, $R_2$ and $R_3$ are alkyl groups having 1 to 8 carbon atoms, inclusive.

7. Vinoxycarbonylmethyltributylphosphonium chloride.

8. A method which comprises polymerizing a compound having the formula

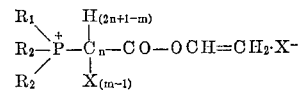

wherein $R_1$, $R_2$ and $R_3$ are alkyl groups having 1 to 8 carbon atoms, inclusive, $m$ is a whole positive integer of from 1 to 3, inclusive, $n$ is a whole positive integer of from 1 to 4, inclusive and X is a halogen atom.

9. A method for producing a copolymer which comprises polymerizing, in the presence of a polymerization catalyst, (1) a compound having the formula

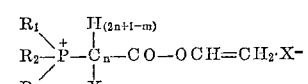

wherein $R_1$, $R_2$ and $R_3$ are alkyl groups having 1 to 8 carbon atoms, inclusive, $m$ is a whole positive integer of from 1 to 3, inclusive, $n$ is a whole positive integer of from 1 to 4, inclusive, and X is a halogen atom, with (2) a monomer containing a polymerizable $CH_2=C<$ group and recovering the copolymer produced thereby.

10. A polymer having the formula

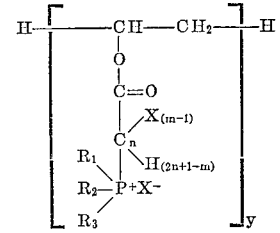

wherein $R_1$, $R_2$ and $R_3$ are alkyl groups having 1 to 8 carbon atoms, inclusive, $m$ is a whole positive integer of from 1 to 3, inclusive, $n$ is a whole positive integer of from 1 to 4, inclusive, X is a halogen atom and $y$ is the number of recurring units in the polymer.

References Cited in the file of this patent

UNITED STATES PATENTS 3,011,000     Garner _____ Nov. 28, 1961

FOREIGN PATENTS 1,134,751     France _____ Apr. 17, 1957

UNITED STATES PATENT OFFICE
CERTIFICATE OF CORRECTION

Patent No. 3,125,555                      March 17, 1964

Philip John Paré et al.

It is hereby certified that error appears in the above numbered patent requiring correction and that the said Letters Patent should read as corrected below.

Column 2, line 47, after "propionate," insert -- vinyl $\beta$-fluoropropionate, vinyl $\alpha$-chloropropionate, --; column 4, line 53, for "citramonic" read -- citraconic --; column 5, line 9, for "polymerized" read -- copolymerized --.

Signed and sealed this 4th day of August 1964.

(SEAL)
Attest:

ERNEST W. SWIDER
Attesting Officer

EDWARD J. BRENNER
Commissioner of Patents